US009798365B2

(12) United States Patent
Guo

(10) Patent No.: US 9,798,365 B2
(45) Date of Patent: Oct. 24, 2017

(54) APPARATUS FOR PREVENTING DEFORMATION OF COMMUNICATION CARD

(71) Applicant: Huawei Device Co., Ltd., Shenzhen (CN)

(72) Inventor: Junsheng Guo, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 453 days.

(21) Appl. No.: 14/482,206

(22) Filed: Sep. 10, 2014

(65) Prior Publication Data

US 2014/0376175 A1    Dec. 25, 2014

Related U.S. Application Data

(63) Continuation of application No. PCT/CN2013/074529, filed on Apr. 22, 2013.

(51) Int. Cl.
*G01N 17/00* (2006.01)
*H01R 13/00* (2006.01)
(Continued)

(52) U.S. Cl.
CPC .............. *G06F 1/206* (2013.01); *F25B 21/04* (2013.01); *F25B 2321/0212* (2013.01)

(58) Field of Classification Search
CPC ............ G01R 1/07307; G01R 31/2874; G01R 31/2805; G01R 31/2863; G01N 17/00; G01N 3/00; H01R 13/00
See application file for complete search history.

(56) References Cited

U.S. PATENT DOCUMENTS 3,713,136 A * 1/1973 Nagy, Jr. ................. H03M 1/52
                                                    324/99 D
6,175,791 B1 * 1/2001 Oouchi ............... B60R 16/0231
                                                    340/425.5
(Continued)

FOREIGN PATENT DOCUMENTS

CN           2919141 Y      7/2007
CN         200946942 Y      9/2007
(Continued)

OTHER PUBLICATIONS

Partial English Translation and Abstract of Chinese Patent Application No. CN2919141Y, Sep. 12, 2014, 15 pages.
(Continued)

*Primary Examiner* — Gail Kaplan Verbitsky
(74) *Attorney, Agent, or Firm* — Conley Rose, P.C.

(57) ABSTRACT

An apparatus for preventing deformation of a communication card includes a card holder configured to install a communication card; a temperature control component that is located on one side of the card holder and connected to a power supply configured to perform cooling or heating; a temperature sensor configured to collect temperature of the card holder; and the power supply configured to generate a supply current according to the temperature collected by the temperature sensor to supply power to the temperature control component, so that the temperature control component performs cooling or heating to maintain the temperature of the card holder within a preset temperature range, and the communication card is not deformed when the communication card is in the card holder and within the preset temperature range.

17 Claims, 1 Drawing Sheet

(51) Int. Cl.
   *G06F 1/20*   (2006.01)
   *F25B 21/04*  (2006.01)

(56) References Cited

U.S. PATENT DOCUMENTS

| | | | |
|---|---|---|---|
| 6,389,817 B1 | 5/2002 | Smith | |
| 7,002,363 B2* | 2/2006 | Mathieu | G01R 1/07342 324/324 |
| 7,239,883 B2* | 7/2007 | Van Bosch | H04M 1/72536 379/433.09 |
| 7,456,641 B2* | 11/2008 | Bae | G01R 31/2891 324/750.03 |
| 7,663,386 B2* | 2/2010 | Hosaka | G01R 1/07342 324/756.03 |
| 7,938,577 B2* | 5/2011 | Takahashi | G05D 23/1919 374/147 |
| 8,021,175 B2* | 9/2011 | Kim | G06K 7/0021 439/159 |
| 8,167,643 B2* | 5/2012 | Yoshida | G06K 7/0047 439/485 |
| 9,048,553 B2* | 6/2015 | Naito | G06F 1/20 |
| 9,395,405 B2* | 7/2016 | Yamada | G01R 1/44 |
| 2003/0085724 A1 | 5/2003 | Mathieu | G01R 1/07342 324/750.03 |
| 2004/0090223 A1* | 5/2004 | Yonezawa | G01R 31/2889 324/756.03 |
| 2007/0258216 A1* | 11/2007 | McBain | H05K 7/20154 361/707 |
| 2008/0130166 A1 | 6/2008 | Auerbach et al. | |
| 2009/0278500 A1* | 11/2009 | To | B60L 11/1851 320/134 |
| 2011/0039442 A1* | 2/2011 | Kim | G06K 7/0021 439/377 |
| 2011/0046433 A1* | 2/2011 | Khodak | A61F 7/007 600/22 |
| 2013/0234745 A1* | 9/2013 | Yamada | G01R 1/44 324/750.11 |
| 2014/0106818 A1* | 4/2014 | Zhao | H04B 1/036 455/558 |
| 2015/0098194 A1* | 4/2015 | Hou | H04B 1/3816 361/737 |
| 2016/0087358 A1* | 3/2016 | Kim | H01R 12/7076 439/68 |
| 2016/0118733 A1* | 4/2016 | Tanaka | G06K 7/04 439/629 |
| 2016/0234680 A1* | 8/2016 | Gao | H04W 4/18 |

FOREIGN PATENT DOCUMENTS

| | | | | |
|---|---|---|---|---|
| CN | 202042573 U | | 11/2011 | |
| CN | 202653770 U | | 1/2013 | |
| CN | EP 2813976 A2 * | | 12/2014 | H04B 1/3816 |
| JP | 02305693 A * | | 12/1990 | |
| JP | 09066680 A * | | 3/1997 | |
| JP | 2001319953 A * | | 11/2001 | |
| JP | 2003108954 A * | | 4/2003 | |
| JP | 2004009564 A | | 1/2004 | |
| JP | 2006135124 A | | 5/2006 | |
| JP | 3819966 B2 * | | 9/2006 | |
| JP | 2007266256 A | | 10/2007 | |
| JP | 2008130936 A | | 6/2008 | |
| JP | 2010171180 A | | 8/2010 | |
| JP | 2012199356 A | | 10/2012 | |

OTHER PUBLICATIONS

Partial English Translation and Abstract of Chinese Patent Application No. CN200946942Y, Sep. 12, 2014, 27 pages.
Partial English Translation and Abstract of Chinese Patent Application No. CN202042573, Sep. 12, 2014, 21 pages.
Partial English Translation and Abstract of Chinese Patent Application No. CN202653770U, Part 1, Nov. 24, 2014, 2 pages.
Partial English Translation and Abstract of Chinese Patent Application No. CN202653770U, Part 2, Nov. 24, 2014, 2 pages.
Foreign Communication From a Counterpart Application, PCT Application No. PCT/CN2013/074529, English Translation of International Search Report dated Jan. 9, 2014, 2 pages.
Foreign Communication From a Counterpart Application, PCT Application No. PCT/CN2013/074529, Written Opinion dated Jan. 9, 2014, 5 pages.
"Smart Cards; UICC-Terminal Interface; Physical and logical characteristics (Release 1999)," ETSI TS 102 221, V3.18.0, Technical Specification, Jul. 2007, 123 pages.
Partial English Translation and Abstract of Japanese Patent Application No. JPA2010171180, Jan. 11, 2017, 10 pages.
Partial English Translation and Abstract of Japanese Patent Application No. JPA2012199356, Jan. 11, 2017, 14 pages.
Foreign Communication From a Counterpart Application, Japanese Application No. 2015-512998, Japanese Office Action dated Nov. 15, 2017, 4 pages.
Foreign Communication From a Counterpart Application, Japanese Application No. 2015-512998, English Translation of Japanese Office Action dated Nov. 15, 2017, 5 pages.
Partial English Translation and Abstract of Japanese Patent Application No. JPA2006135124, Apr. 29, 2016, 35 pages.
Partial English Translation and Abstract of Japanese Patent Application No. JPA2007266256, Apr. 29, 2016, 26 pages.
Partial English Translation and Abstract of Japanese Patent Application No. JPA2008130936, Apr. 29, 2016, 34 pages.
Foreign Communication From a Counterpart Application, Japanese Application No. 2015-512998, Japanese Office Action dated Mar. 1, 2016, 3 pages.
Foreign Communication From a Counterpart Application, Japanese Application No. 2015-512998, English Translation of Japanese Office Action dated Mar. 1, 2016, 4 pages.
Foreign Communication From a Counterpart Application, European Application No. 13876771.0, Extended European Search Report dated Mar. 5, 2015, 8 pages.

* cited by examiner

APPARATUS FOR PREVENTING DEFORMATION OF COMMUNICATION CARD

CROSS-REFERENCE TO RELATED APPLICATIONS

This application is a continuation of International Application No. PCT/CN2013/074529, filed on Apr. 22, 2013, which is hereby incorporated by reference in its entirety.

TECHNICAL FIELD

The present invention relates to the field of communication electronics products, and in particular, to an apparatus for preventing deformation of a communication card.

BACKGROUND

An in-vehicle device is an abbreviated name of an in-vehicle infotainment product that is installed inside an automobile. The in-vehicle device can functionally realize information communications between human and vehicle and between vehicles. For some in-vehicle devices, their screens are set on their hosts, while for some in-vehicle devices, their screens are separated from their hosts. With the development of science and technologies, the in-vehicle device is developed from compact disc (CD) and digital versatile disc (DVD) navigation at an early stage towards an intelligent and information-based direction. Currently, apart from conventional functions such as navigation and radio, music and video playing, the in-vehicle device gradually has communications functions of a communication terminal such as a mobile phone, and supports plugging of a communication card. The communication card includes a subscriber identity module (SIM) card, a secure digital (SD) memory card, a time division (TD) card, and the like.

Due to particularity of an automobile application, temperature of the in-vehicle device is required to be between 31° degrees Celsius (° C.) and +70° C. However, during running, an automobile may often encounter unexpected situations, which make the temperature of the in-vehicle device rise or drop abruptly. A communication card is generally made of macromolecule plastic materials, and its temperature is the same as the temperature of its card holder and the temperature of the in-vehicle device. A maximum value of normal working temperature of the communication card is less than 70° C., while the temperature of the in-vehicle device may reach 85° C. instantaneously. In this case, if there is no proper protection measure, the communication card that is placed inside the in-vehicle device is easily deformed. The communication card inside the in-vehicle device may also be easily deformed when the temperature of the in-vehicle device drops instantaneously.

To prevent deformation of a communication card inside an in-vehicle device due to impact temperature of an automobile, the prior art reduces deformation magnitude of the communication card by optimizing the card holder of the communication card. However, the manner of optimizing the card holder can only reduce the deformation magnitude of the communication card, but cannot radically avoid deformation of the communication card under a high or low temperature of the in-vehicle device.

SUMMARY

Embodiments of the present invention provide an apparatus for preventing deformation of a communication card, so as to avoid deformation of a communication card installed inside a card holder.

A first aspect of an embodiment of the present invention provides an apparatus for preventing deformation of a communication card, where the apparatus may include a card holder configured to install the communication card; a temperature control component that is located on one side of the card holder, connected to a power supply, and configured to perform cooling or heating; a temperature sensor configured to collect temperature of the card holder; and the power supply configured to generate a supply current according to the temperature collected by the temperature sensor to supply power to the temperature control component, so that the temperature control component performs cooling or heating to maintain the temperature of the card holder within a preset temperature range, and the communication card is not deformed when the communication card is in the card holder and within the preset temperature range.

With reference to the first aspect, in a first possible implementation manner, a printed circuit board is installed at the bottom of the card holder, and the temperature control component is installed on the top of the card holder.

With reference to the first aspect, in a second possible implementation manner, the apparatus provided in the embodiment of the present invention further includes a printed circuit board, where the card holder is installed on a first side of the printed circuit board, the temperature control component is installed on a second side of the printed circuit board, and the first side and the second side are a front side and a back side of the printed circuit board, respectively.

With reference to the second possible implementation manner of the first aspect, in a third possible implementation manner, the card holder is in an installation position on the first side of the printed circuit board, where the installation position of the card holder on the first side of the printed circuit board is opposite to an installation position of the temperature control component on the second side of the printed circuit board.

With reference to the first possible implementation manner of the first aspect, in a fourth possible implementation manner, a heat-conducting filling material is laid between the card holder and the temperature control component.

With reference to the second possible implementation manner of the first aspect, in a fifth possible implementation manner, a heat-conducting filling material is laid between the printed circuit board and the temperature control component.

With reference to the fourth or the fifth possible implementation manner of the first aspect, in a sixth possible implementation manner, an insulation layer is filled between the heat-conducting filling material and the temperature control component.

With reference to the first aspect and the first to the sixth possible implementation manners of the first aspect, in a seventh possible implementation manner, the temperature control component includes a PN-type semiconductor cooler, controlling, when temperature of one side of the communication card collected by the temperature sensor is higher than a first threshold, a supply current to be input from an N junction and output from a P junction of the PN-type semiconductor cooler, so that the temperature control component performs cooling, and controlling, when temperature of one side of the communication card collected by the temperature sensor is lower than a second threshold, the supply current to be input from the P junction and output from the N junction of the PN-type semiconductor cooler, so that the temperature control component performs heating, where the second threshold is lower than the first threshold.

As can be seen from the above, in some feasible implementation manners of the present invention, a temperature control component is installed on one side of a card holder of a communication card and is connected to a power supply; and the temperature control component performs cooling or heating using the power supply, so that temperature of the communication card installed in the card holder is maintained within a normal working temperature range.

BRIEF DESCRIPTION OF DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings according to these accompanying drawings without creative efforts.

DESCRIPTION OF EMBODIMENTS

Figure 1:
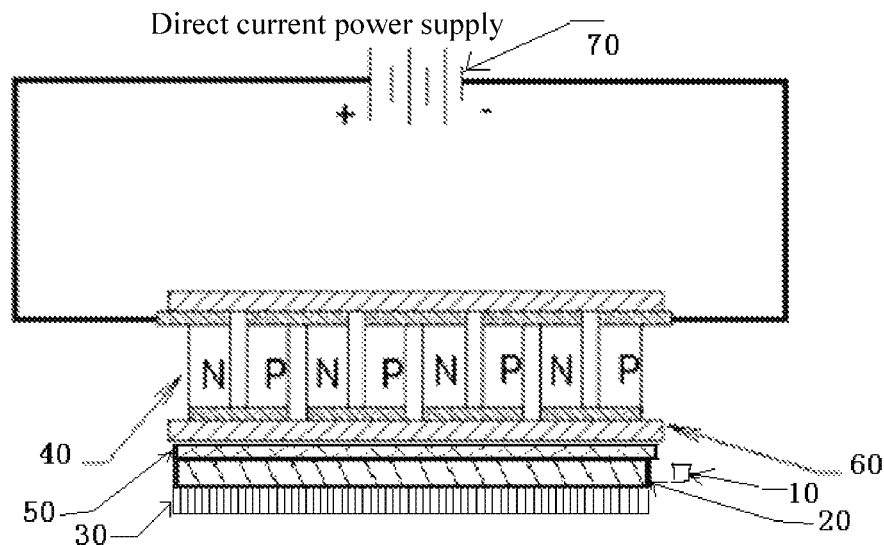
FIG. 1 is a schematic structural diagram of an apparatus for preventing deformation of a communication card according to an embodiment of the present invention.

The following clearly describes the technical solutions in the embodiments of the present invention with reference to the accompanying drawings in the embodiments of the present invention. The embodiments to be described are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides an apparatus for preventing deformation of a communication card, where the apparatus includes a card holder configured to install a communication card; a temperature control component that is located on one side of the card holder and connected to a power supply configured to perform cooling or heating; a temperature sensor configured to collect temperature of the card holder; and the power supply configured to generate a supply current according to the temperature collected by the temperature sensor to supply power to the temperature control component, so that the temperature control component performs cooling or heating to maintain the temperature of the card holder within a preset temperature range, and the communication card is not deformed when the communication card is in the card holder and within the preset temperature range.

As can be seen from the above, a characteristic that the temperature control component is capable of performing heating or cooling is utilized in the embodiment of the present invention. When temperature of the communication card is low, the power supply controls a temperature rise function of the temperature control component through a current (currents in this specification all refer to supply currents) output by the power supply to raise temperature of the card holder that can hold the communication card; and when temperature of the communication card is high, an anode and a cathode of the power supply are interchanged to change the current output direction of the power supply, so that the power supply controls a temperature reduction function of the temperature control component through the current output by the power supply after the direction change to reduce temperature of the card holder that can hold the communication card. In this way, the temperature of the communication card is always maintained within a normal working temperature range (for example, −20° C. to +70° C.) when the communication card is installed in the card holder, thereby avoiding deformation of the communication card due to a temperature change.

The change of the anode and cathode of the power supply includes the following implementation manners:

If a microprocessor is included inside the power supply, the microprocessor inside the power supply implements interchange between the anode and cathode of the power supply.

If a microprocessor is not included inside the power supply, because the apparatus for preventing deformation of a communication card is in an in-vehicle device, a central processing unit (CPU) of the in-vehicle device can automatically implement interchange between the anode and cathode of the power supply by setting up a circuit. How to set up a circuit to implement interchange between an anode and a cathode of a power supply belongs to the prior art of the field, which is not described herein any further.

The following details an apparatus for preventing deformation of a communication card in the present invention according to specific embodiments.

Referring to FIG. 1, as a feasible implementation manner, an apparatus for preventing deformation of a communication card in the present invention (applicable to a terminal such as an in-vehicle device) may include a card holder 20 configured to install a communication card, where the bottom of the card holder 20 is installed on a print circuit board 30; a temperature control component 40 that is installed at the top of the card holder 20; a temperature sensor 10 that is installed on one side of the card holder 20; and a direct current power supply 70 that is connected to the temperature control component 40. In a specific implementation, the temperature control component 40 may be a semiconductor cooler thermoelectric cooler (TEC) formed by an N-type semiconductor and a P-type semiconductor.

In a specific implementation, when a communication card is installed in the card holder 20, and temperature of the in-vehicle device becomes higher or lower suddenly, the temperature sensor 10 on one side of the card holder 20 collects ambient temperature of the card holder. As a feasible implementation manner, when the power supply 70 does not include a microprocessor, the temperature sensor 10 can be connected to a CPU (which is not shown in the diagram and can be located on the printed circuit board (PCB)) of the in-vehicle device and is configured to transmit the collected temperature to the CPU of the in-vehicle device; the CPU of the in-vehicle device compares the temperature collected by the temperature sensor 10 with a first threshold (which can be preset, for example, to 70° C. in a specific implementation) and a second threshold (which can be preset, for example, to −20° C. in a specific implementation) and controls a current direction of the power supply 70 according to a comparison result; and further, the temperature control component is controlled to perform cooling or heating according to the current direction of the power supply 70, so as to maintain temperature of the communication card in the card holder 20 within a preset normal temperature range, thereby preventing deformation of the communication card.

In a specific implementation, the temperature sensor 10 may be placed in any position (for example, on the printed circuit board of the in-vehicle device) inside the in-vehicle device. When the temperature sensor 10 is closely attached to the card holder 20 of the communication card, the temperature read by the temperature sensor 10 is the temperature of the card holder 20 of the communication card, and the temperature sensor 10 transmits the read temperature to the CPU of the in-vehicle device. When there is a certain distance between the temperature sensor 10 and the card holder of the communication card, a temperature difference between the card holder of the communication card and the temperature sensor is required to be calibrated before the card holder is delivered from a factory, so that the CPU of the in-vehicle device can calculate the temperature of the card holder of the communication card according to the temperature read by the temperature sensor and the calibrated temperature difference.

Further, based on the temperature of the card holder of the communication card, the CPU of the in-vehicle device may send a control signal (for example, an interrupt signal) to the power supply 70 that is connected to the CPU of the in-vehicle device, so as to control the current direction of the power supply 70 (for example, an interrupt signal "0" indicates that a current flows into the anode of the power supply 70 and flows out of the cathode of the power supply 70; and an interrupt signal "1" indicates that a current flows into the cathode of the power supply 70 and flows out of the anode of the power supply 70), and positive and negative currents of the power supply 70 control the temperature control component 40 to perform cooling or heating.

As another feasible implementation manner, when the power supply 70 includes a microprocessor, the temperature sensor 10 may be connected to the microprocessor (not shown in the diagram) inside the power supply 70 of the in-vehicle device and is configured to directly transmit the collected temperature to the microprocessor inside the power supply 70, and the microprocessor implements a function of the CPU of the in-vehicle device in the foregoing feasible implementation manner.

In a specific implementation, the CPU and/or the power supply 70 of the in-vehicle device in this embodiment of the present invention may be in any position (for example, on the printed circuit board of the in-vehicle device) inside the in-vehicle device, and position settings do not affect the card holder of the communication card.

In a specific implementation, a heat-conducting filling material 50 (which may be not configured) is laid between the card holder 20 and the temperature control component 40, and an insulation layer 60 (which may be not configured) is disposed between the heat-conducting filling material 50 and the temperature control component 40, so that heat can be better transferred between the temperature control component 40 and the communication card. A function of the insulation layer 60 is avoiding influences on another component in the device due to electric leakage in a circuit of the temperature control component 40.

As can be seen from the above, in some feasible implementation manners of the present invention, the temperature control component is installed on the top of the card holder used to install the communication card; the temperature control component is connected to the power supply; and the temperature control component is controlled, using the power supply, to perform cooling or heating, so that temperature of the communication card installed in the card holder is maintained within a normal working temperature range. In this way, the deformation of the communication card due to a temperature change is avoided.

Figure 2:
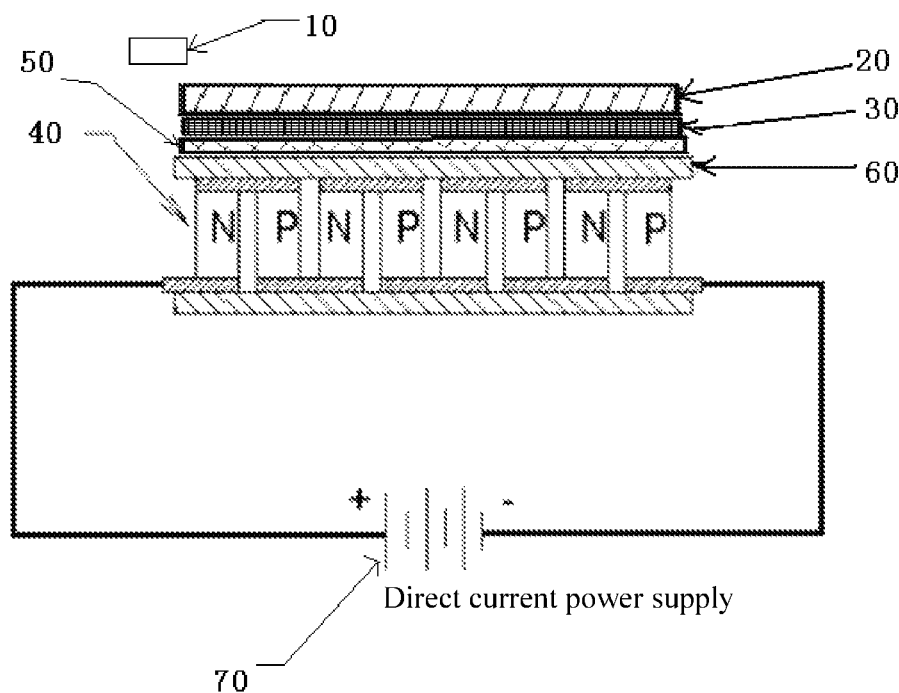
FIG. 2 is a schematic structural diagram of an apparatus for preventing deformation of a communication card according to another embodiment of the present invention.

Referring to FIG. 2, as a feasible implementation manner, a difference between this embodiment and the embodiment shown in FIG. 1 is installation positions of temperature control components 40 are different. In this embodiment, the temperature control component 40 and a card holder 20 are installed on a front side and a back side of a printed circuit board 30, respectively. Further, an apparatus for preventing deformation of a communication card (which may applies to a terminal such as an in-vehicle device) in the present invention may include a printed circuit board 30, a card holder 20 that is installed on a first side of the printed circuit board 30 and configured to install a communication card, a temperature control component 40 that is installed on a second side of the printed circuit board 30, a temperature sensor 10 that is installed on one side of the card holder 20, a direct current power supply 70 that is connected to the temperature control component 40, a heat-conducting filling material 50 (which may be not configured) that is laid between the printed circuit board 30 and the temperature control component 40, and an insulation layer 60 (which may be not configured) that is disposed between the heat-conducting filling material 50 and the temperature control component 40, where the first side and the second side are the front side and the back side of the printed circuit board 30, respectively. In a specific implementation, the card holder is in an installation position on the first side of the printed circuit board, where the installation position of the card holder on the first side of the printed circuit board may be opposite to or in a certain distance from an installation position of the temperature control component on the second side of the printed circuit board.

As can be seen from the above, in some feasible implementation manners of the present invention, the temperature control component is installed on the printed circuit board; the temperature control component is connected to the power supply; and the temperature control component is controlled, using the power supply, to perform cooling or heating, so that temperature of a communication card installed in the card holder is maintained within a normal working temperature range. In this way, the deformation of the communication card due to a temperature change is avoided.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

The principle and implementation manner of the present invention are described herein through specific embodiments. The description of the embodiments is merely provided for ease of understanding of the method and core idea of the present invention. A person of ordinary skill in the art can make variations and modifications with respect to the implementation manner and applicability according to the idea of the present invention. Therefore, the specification shall not be construed as a limitation on the present invention.

What is claimed is:

1. An apparatus for preventing deformation of a communication card comprising:
   a card holder configured to install a communication card;

a temperature control component located on one side of the card holder and connected to a power supply configured to perform cooling or heating according to a current direction of the power supply;

a temperature sensor configured to collect temperature of the card holder, wherein the power supply is configured to generate a supply current according to the temperature collected by the temperature sensor to supply power to the temperature control component such that the temperature control component performs cooling or heating to maintain the temperature of the card holder within a preset temperature range, and wherein the communication card is not deformed when the communication card is in the card holder and within the preset temperature range; and a microprocessor configured to interchange directions of an anode and a cathode of the power supply when the temperature of the card holder reaches a lower threshold such that the temperature control component heats the card holder, wherein the communication card comprises a subscriber identity module (SIM) card, a secure digital (SD) memory card, or a time division (TD) card, and wherein the temperature control component is configured to heat and cool the communication card.

2. The apparatus for preventing deformation of a communication card according to claim 1 further comprising a printed circuit board, wherein the printed circuit board is installed at the bottom of the card holder, and wherein the temperature control component is installed on the top of the card holder.

3. The apparatus for preventing deformation of a communication card according to claim 2, wherein a heat-conducting filling material is laid between the card holder and the temperature control component.

4. The apparatus for preventing deformation of a communication card according to claim 3, wherein an insulation layer is filled between the heat-conducting filling material and the temperature control component.

5. The apparatus for preventing deformation of a communication card according to claim 2, wherein the temperature control component comprises a PN-type semiconductor cooler, operable to control the supply current, when temperature of one side of the communication card collected by the temperature sensor is higher than a first threshold, to be input from an N junction and output from a P junction of the PN-type semiconductor cooler, so that the temperature control component performs cooling, and operable to control the supply current, when temperature of one side of the communication card collected by the temperature sensor is lower than the lower threshold, to be input from the P junction and output from the N junction of the PN-type semiconductor cooler, so that the temperature control component performs heating, and wherein the lower threshold is lower than the first threshold.

6. The apparatus for preventing deformation of a communication card according to claim 1 further comprising a printed circuit board, wherein the card holder is installed on a first side of the printed circuit board, wherein the temperature control component is installed on a second side of the printed circuit board, and wherein the first side and the second side are a front side and a back side of the printed circuit board, respectively.

7. The apparatus for preventing deformation of a communication card according to claim 6, wherein the temperature control component comprises a PN-type semiconductor cooler, operable to control the supply current, when temperature of one side of the communication card collected by the temperature sensor is higher than a first threshold, to be input from an N junction and output from a P junction of the PN-type semiconductor cooler, so that the temperature control component performs cooling, and operable to control the supply current, when temperature of one side of the communication card collected by the temperature sensor is lower than the lower threshold, to be input from the P junction and output from the N junction of the PN-type semiconductor cooler, so that the temperature control component performs heating, and wherein the lower threshold is lower than the first threshold.

8. The apparatus for preventing deformation of a communication card according to claim 6, wherein the card holder is in an installation position on the first side of the printed circuit board, and wherein the installation position of the card holder on the first side of the printed circuit board is opposite to an installation position of the temperature control component on the second side of the printed circuit board.

9. The apparatus for preventing deformation of a communication card according to claim 6, wherein a heat-conducting filling material is laid between the printed circuit board and the temperature control component.

10. The apparatus for preventing deformation of a communication card according to claim 9, wherein an insulation layer is filled between the heat-conducting filling material and the temperature control component.

11. The apparatus for preventing deformation of a communication card according to claim 1, wherein the temperature control component comprises a PN-type semiconductor cooler, operable to control the supply current, when temperature of one side of the communication card collected by the temperature sensor is higher than a first threshold, to be input from an N junction and output from a P junction of the PN-type semiconductor cooler, so that the temperature control component performs cooling, and operable to control the supply current, when temperature of one side of the communication card collected by the temperature sensor is lower than the lower threshold, to be input from the P junction and output from the N junction of the PN-type semiconductor cooler, so that the temperature control component performs heating, and wherein the lower threshold is lower than the first threshold.

12. The apparatus for preventing deformation of a communication card according to claim 1, wherein the first threshold is 70° C. and the lower threshold is −20° C.

13. The apparatus for preventing deformation of a communication card according to claim 1, wherein the microprocessor is outside of the power supply.

14. The apparatus for preventing deformation of a communication card according to claim 1, wherein the temperature control component comprises a PN-type semiconductor heater/cooler, and wherein the PN-type semiconductor heater/cooler comprises four P-type elements and four N-type elements.

15. The apparatus for preventing deformation of a communication card according to claim 1, wherein the communication card comprises the SIM card.

16. The apparatus for preventing deformation of a communication card according to claim 1, wherein the communication card comprises the SD memory card.

17. The apparatus for preventing deformation of a communication card according to claim 1, wherein the communication card comprises the TD card.

* * * * *